(12) United States Patent
Lahti et al.

(10) Patent No.: US 11,020,814 B2
(45) Date of Patent: Jun. 1, 2021

(54) QUICK-CHANGE WIRE FEEDER

(71) Applicant: Illinois Tool Works Inc., Glenview, IL (US)

(72) Inventors: Thomas D. Lahti, Combined Locks, WI (US); Edward J. Crum, Appleton, WI (US); Michael P. Vandenberg, Appleton, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 251 days.

(21) Appl. No.: 15/429,965

(22) Filed: Feb. 10, 2017

(65) Prior Publication Data

US 2017/0232545 A1 Aug. 17, 2017

Related U.S. Application Data

(60) Provisional application No. 62/294,600, filed on Feb. 12, 2016.

(51) Int. Cl.
- *B23K 9/133* (2006.01)
- *B23K 9/12* (2006.01)
- *B65H 49/20* (2006.01)

(52) U.S. Cl.
CPC ............ *B23K 9/133* (2013.01); *B23K 9/124* (2013.01); *B65H 49/205* (2013.01); *B65H 2701/36* (2013.01)

(58) Field of Classification Search
CPC ........ B23K 9/124; B23K 9/133; B23K 9/125; B65H 2701/36; B65H 49/205

(Continued)

(56) References Cited

U.S. PATENT DOCUMENTS

| | | | | |
|---|---|---|---|---|
| 2,657,371 A | * | 10/1953 | Huston | .............. H01R 4/26 |
| | | | | 24/134 R |
| 3,018,975 A | * | 1/1962 | Kulicke, Jr. | .......... B21C 47/34 |
| | | | | 226/97.4 |

(Continued)

FOREIGN PATENT DOCUMENTS

| | | |
|---|---|---|
| CN | 104202447 A | 12/2014 |
| CN | 104511761 A | 4/2015 |
| JP | 2006140378 A | 6/2006 |

OTHER PUBLICATIONS

PCT, Notification of Transmittal of the International Search Report and the Written Opinion of the International Searching Authority, or the Declaration, in International application No. PCT/US2017/017608, dated May 12, 2017 (15 pages).

(Continued)

*Primary Examiner* — Dana Ross
*Assistant Examiner* — Joseph W Iskra
(74) *Attorney, Agent, or Firm* — McAndrews, Held & Malloy, Ltd.

(57) ABSTRACT

Apparatuses, systems, and/or methods for securing and unsecuring a wire feeder in an automatic welding system without using tools are disclosed. The welding system can include, for example, a robotic arm with a welding torch, an adaptor, and a wire feeder. The adaptor can include, for example, a quick-disconnect member located on the robotic arm. The wire feeder that can be removed from the adaptor after the quick-disconnect member has been actuated. The wire feeder can be installed and secured with tools by placing the wire feeder in the actuator and actuating the quick-disconnect member of the actuator.

20 Claims, 7 Drawing Sheets

(58) Field of Classification Search
USPC .............. 219/137.63, 74, 137.31, 240, 247
See application file for complete search history.

(56) References Cited

U.S. PATENT DOCUMENTS

2014/0166626 A1* 6/2014 Lizotte ................ B23K 9/1336
219/74
2016/0008907 A1* 1/2016 Miller ................ B23K 9/0286
219/60 A

OTHER PUBLICATIONS

PCT, Notification Concerning Transmittal of International Preliminary Report on Patentability in Application No. PCT/US2017/017608, dated Aug. 23, 2018 (9 pages).
Canadian Office Action for Application No. 3014321, dated Jun. 17, 2019, 4 pages.

* cited by examiner

QUICK-CHANGE WIRE FEEDER

RELATED APPLICATIONS

The present application claims priority to and benefit from U.S. Application No. 62/294,600, filed Feb. 12, 2016. The above-identified application is hereby incorporated herein by reference in its entirety.

BACKGROUND

In automatic welding applications, wire is fed from a wire spool mounted on a spool support or a bulk container through a wire feeder to an automatic welding gun. Sometimes, the wire can slip on the drive rolls such as when wire is not fed smoothly to the automatic welding gun. In such circumstances, the wire can back up like a "bird nest" in and/or around the wire feeder.

Wire bird nests can cause a number of problems. For example, since the wire is backing up and forming the wire bird nest, the wire is no longer being fed into the automatic welding gun for use in the automatic welding application. In addition, since the wire is at weld potential, the wire bird nest can short circuit the wire feeder or components within or connected to the wire feeder. Such a short circuit can cause welding problems and/or permanently damage the wire feeder, the robot, or the components (e.g., wire feeder drive motor) within or connected to the wire feeder.

Typically, the welding application must be halted so that the wire feeder can be cleaned out or removed. This task requires tools and is labor intensive, costly, and the source of additional problems if removal is required. For example, removing the wire feeder can be at least a two-person job. To remove the wire feeder in a conventional wire feeder setup, screws, bolts, and/or nuts are removed using various tools. The wire feeder is usually mounted using a formed steel bracket and some type of isolation system. For example, the wire feeder can be screwed or bolted onto a non-conductive plate of the automatic welder with screws (or other types of fasteners) and non-conductive shoulder washers or other forms of isolation systems. Non-conductive isolators such as shoulder washers are used to isolate the fasteners and/or systems from the weld potential. After the wire feeder has been removed and the wire bird nest cleaned out, the wire feeder is assembled back on the non-conductive plate. During installation of the wire feeder, the non-conductive shoulder washers are susceptible to human error. For example, the non-conductive should washers can be lost or compromised if too much torque is applied. If the non-conductive shoulder washers are not installed or are damaged during installation, the lack of electrical isolation can cause short circuit issues that can cause a fire and/or permanently damage the wire feeder or the components within or connected to the wire feeder. These potential hazards can be costly and dangerous. Further, the process of removing and installing the wire feeder is time consuming and costly since the automatic welder is inactive.

What is needed is a wire feeder that can be replaced quickly so as to minimize the down time of the automatic welder. Further, what is needed is a wire feeder that can be replaced without the use of tools and can be performed by one person without compromising the safety of the wire feeder and/or the automatic welder.

BRIEF SUMMARY

Apparatuses, systems, and methods for providing quick-change wire feeders in welding applications are provided substantially as illustrated by and/or described in connection with at least one of the figures, as set forth more completely in the claims.

DETAILED DESCRIPTION

Some embodiments of apparatuses, systems, and methods for providing a quick-change wire feeder in a welding application.

Figure 1:
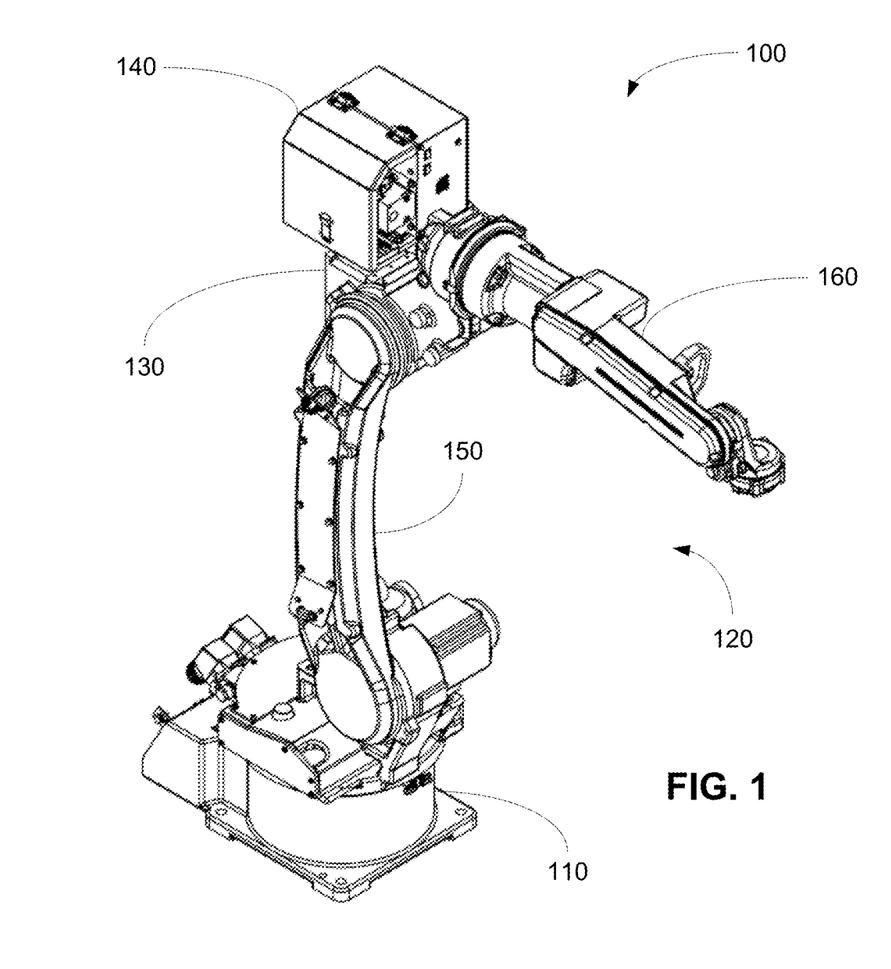
FIG. 1 shows an embodiment of a portion of an automatic welding system according to the present disclosure.
Figure 2:
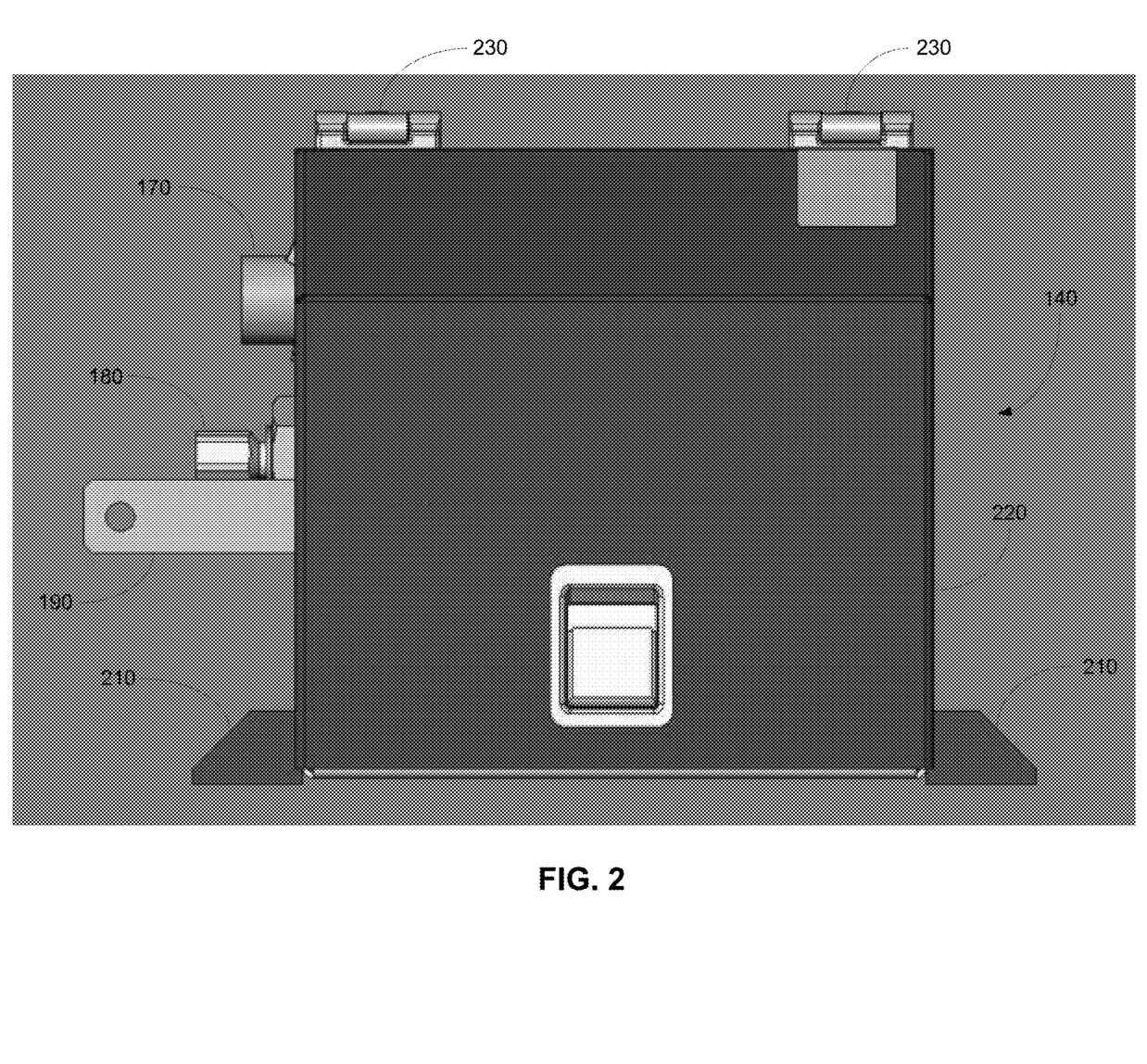
FIG. 2 shows a front view of an embodiment of a wire feeder according to the present disclosure.
Figure 3:
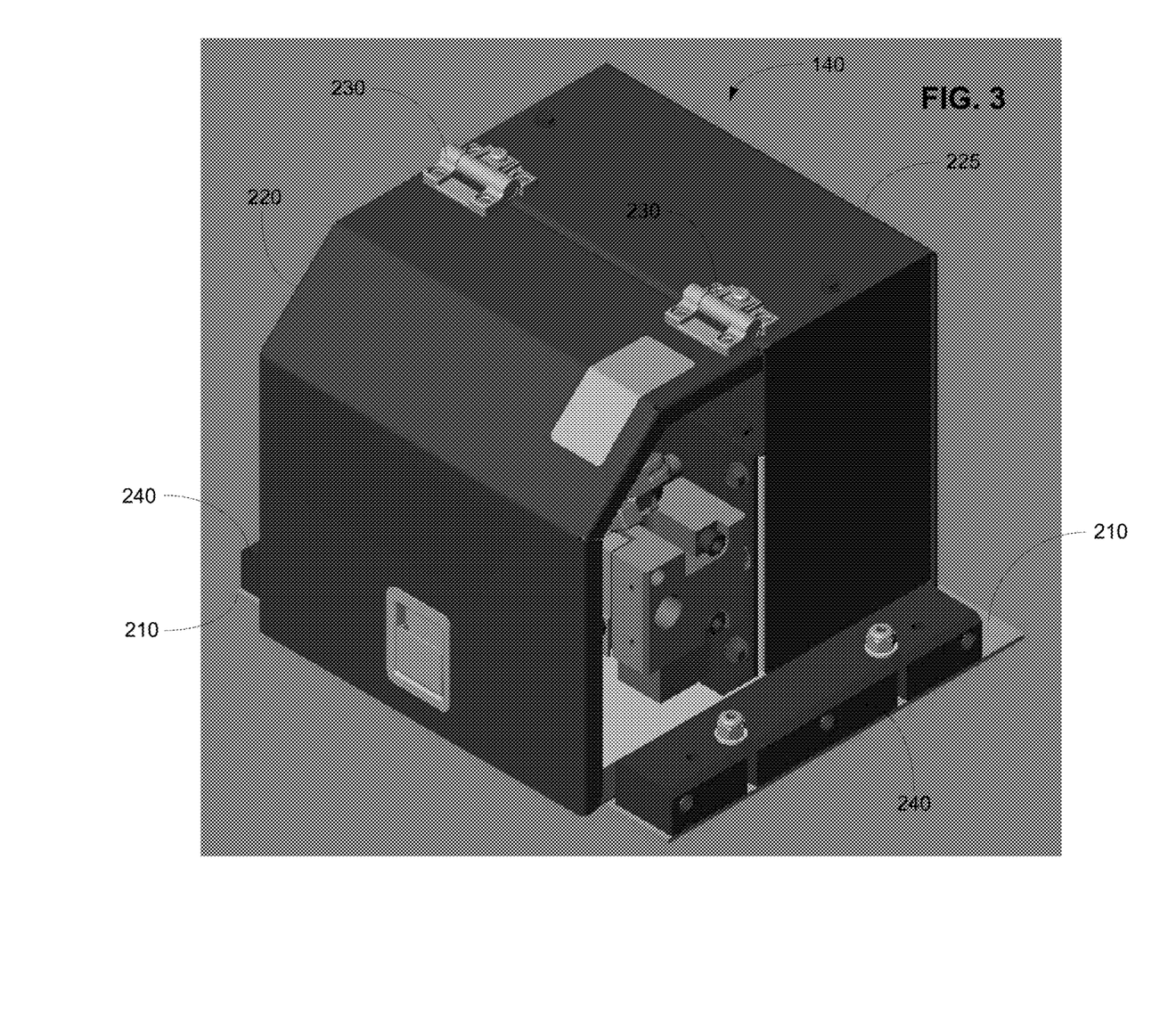
FIG. 3 shows a first perspective view of an embodiment of the wire feeder according to the present disclosure.
Figure 4:
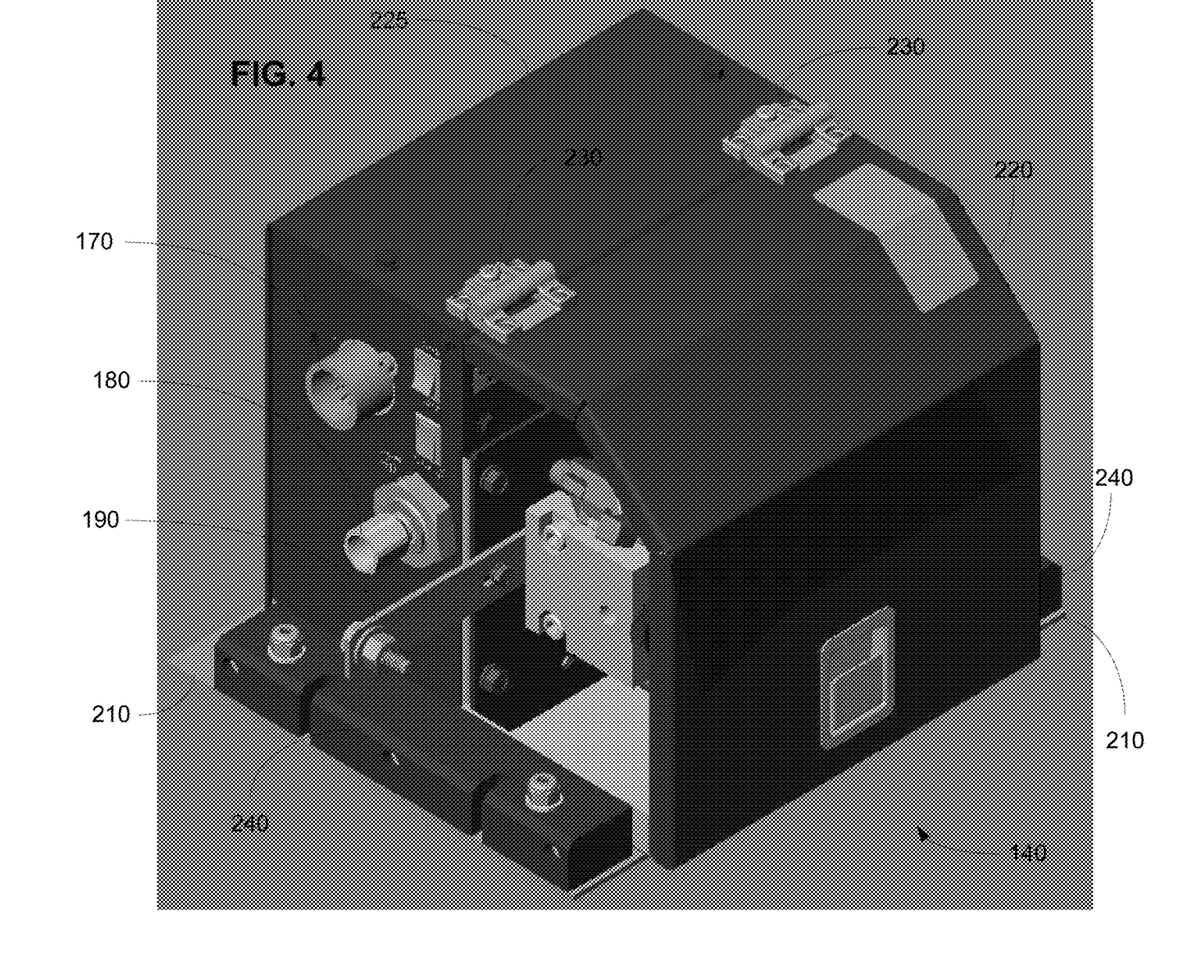
FIG. 4 shows a second perspective view of the wire feeder shown in FIG. 3.
Figure 5:
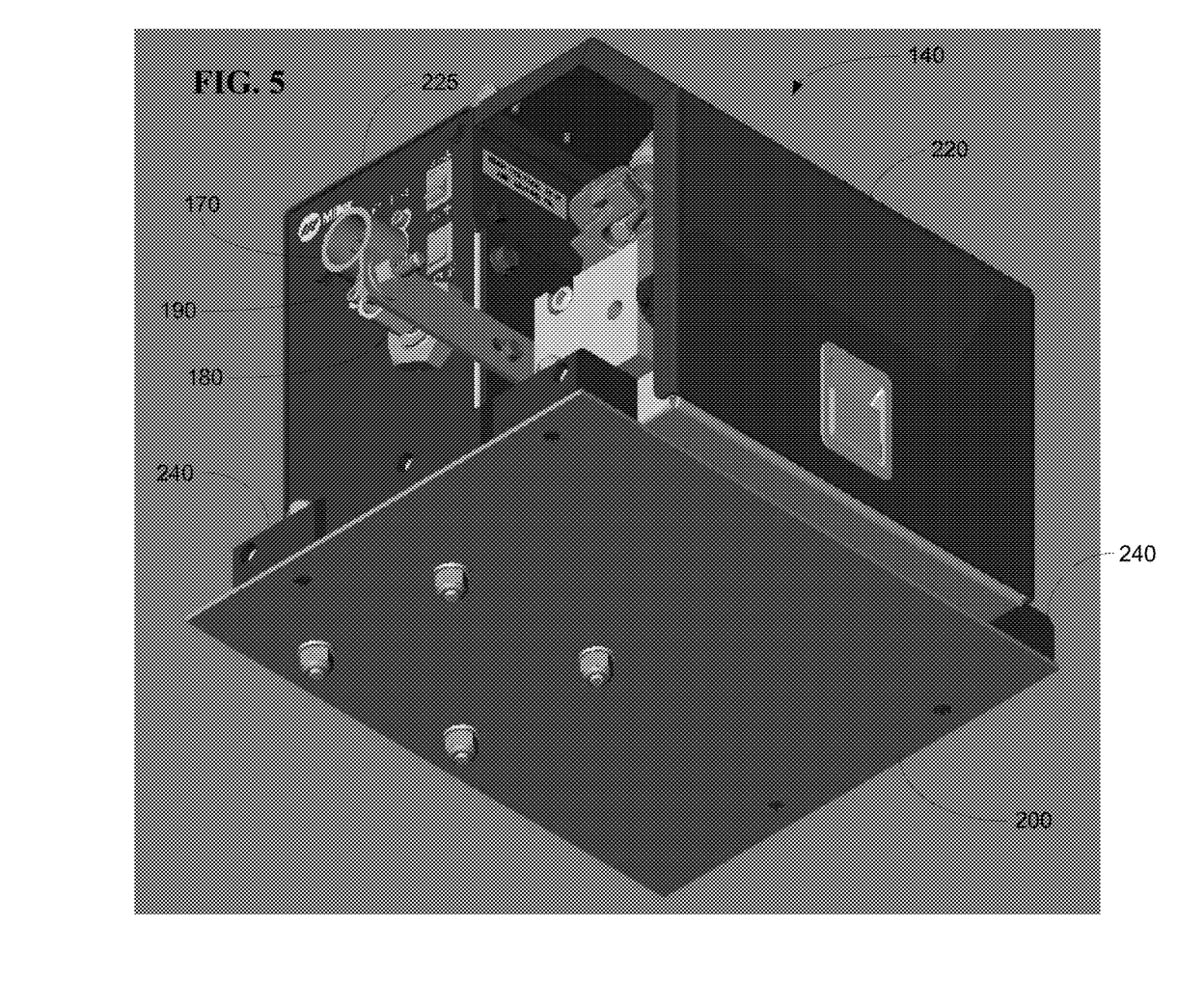
FIG. 5 shows a second perspective view of the wire feeder shown in FIG. 3.

FIG. 1 shows an embodiment of a portion of an automatic welding system according to the present disclosure. The automatic welding system 100 includes, for example, a base 110, a robotic arm 120, a wire feeder support 130, and the wire feeder 140. The robotic arm 120, which sits on the base 110 and can move and/or rotate in multiple degrees of freedom, includes a first portion 150 and a second portion 160 that is attached to the first portion 150. The wire feeder support 130 and the wire feeder 140 extend from the robotic arm 120. Although illustrated in a particular location, some embodiments contemplate placing the wire feeder 140 on other locations on the robotic arm 120 or other locations in the automatic welding system 100. A welding torch or gun (not shown) can be attached to the end of the second portion 160 of the robotic arm 120.

In operation when the wire feeder 140 needs repair, maintenance, and/or replacement, for example, the wire feeder 140 according to some embodiments can be quickly removed from the automatic welding system 100 and/or the robotic arm 120 without the use of tools. In some embodiments, the wire feeder 140 according to some embodiments can be quickly removed from the automatic welding system 100 and/or the robotic arm 120 by quickly removing the wire feeder 140 from wire feeder support 130 without the use of tools. In some embodiments, the wire feeder 140 can be quickly removed to correct a problem that has arisen or is developing, for scheduled maintenance (e.g., preventative maintenance), and/or to replace the wire feeder 140, for example.

In some embodiments, one or more quick-disconnect members (e.g., cam levers, thumb screws, trigger locks, etc.) that are part of or connected to the wire feeder 140, the wire feeder support 130, and/or the robotic arm 120 can be actuated (e.g., actuated by hand), thereby releasing the wire feeder 140 from the wire feeder support 130, or thereby releasing the wire feeder 140 and the wire feeder support 130 from the automatic welding system 100 and/or the robotic arm 120. Once released, the wire feeder 140 can then be repaired, maintained, and/or replaced.

In some embodiments, the wire feeder 140 can be installed by placing the wire feeder 140 on the wire feeder support 130, or by placing the wire feeder 140 and the wire feeder support 130 on the robotic arm 120, and then actuating, without tools, the one or more quick-disconnect members to lock in the wire feeder 140 into the wire feeder support 130, or to lock in the wire feeder 140 and the wire feeder support 130 into the robotic arm 120 of the automatic welding system 100.

In some embodiments, the wire feeder 140 is housed in a housing or module and is completely isolated electrically. Some embodiments of the wire feeder 140 showing the housing or module are illustrated in FIGS. 2-5. With the use of the one or more quick-disconnect members, the wire feeder 140 can be removed, replaced, and/or re-installed by one person without any tools. Further, since the wire feeder 140 is completely isolated electrically, isolation components (e.g., non-conductive plates, non-conductive washers, etc.), the wire feeder 140 can be removed, replaced, and/or re-installed without disassembling and/or compromising isolation components that isolate the wire feeder 140 from weld potential, thereby avoiding possible electrical hazards. Further, by using the one or more quick-disconnect members and replacing the faulty wire feeder 140 with a working wire feeder 140, the down time of the automatic welding system 100 and related costs can be minimized.

FIGS. 2-5 show different views of some embodiments of the wire feeder 140 according to the present disclosure. Referring to FIGS. 2-5, the wire feeder 140 includes, for example, a communications port 170, a gas port 180, a bus bar 190, a plate 200 with tapered rails 210, a front cover 220, a back cover 225 (e.g., a rear housing), hinges 230, isolation housings 240, and other parts listed in FIG. 7 and shown in an exploded view of an embodiment of the wire feeder 140 in FIG. 6.

In some embodiments, the back cover 225 provides the communications port 170 and the gas port 180. The communications port 170 provides control communications that can, for example, control the rate at which wire is fed by the wire feeder 140. Further, other electrical control signals can be transmitted and received through the communications port 170. The gas port 180 provides an inlet for shielding gas that is used during a welding operation. The back cover 225 houses some the parts, circuitry, and/or components for controlling the wire feeder 140. In some embodiments, the back cover 225 also houses the motor assembly.

In some embodiments, the front cover 220 houses the parts and/or components (e.g., drive assembly) that feed the wire to the robotic arm 120 and ultimately to the welding torch. The wire feeder 140 is powered by the bus par 190 which is housed, in part, by the front cover 220. The front cover 220 is connected to the back cover 225 via hinges 230 and provides easy access to the drive assembly, for example.

In some embodiments, the front cover 220 and the back cover 225 rest on the plate 200 with the tapered rails 210. The plate 200 can be made of a non-conductive material such as a plastic. In some embodiments, the plate 200 and the rest of the wire feeder 140 can be removed, replaced, and/or installed as a unit from an adapter by actuating the one or more quick-disconnect members. In some embodiments, the adapter is mounted on the robotic arm 120 or the wire feeder support 130 and remains behind when the wire feeder 140 is removed.

The plate 200 extends beyond the covers 220, 225 to form rails 210. The tapered rails 210 can be plastic. Resting on the tapered rails 210 are isolation housings 240. The isolation housings 240 house and keep isolated the isolation members (e.g., non-conductive washers). Since the wire feeder 140 is quickly removed as a unit or module, the isolation members do not need to be accessed and/or possibly compromised or lost by disassembly or reassembly. Thus, many of the hazards and costs associated with human error regarding the handling of the isolation members are eliminated.

Figure 6:
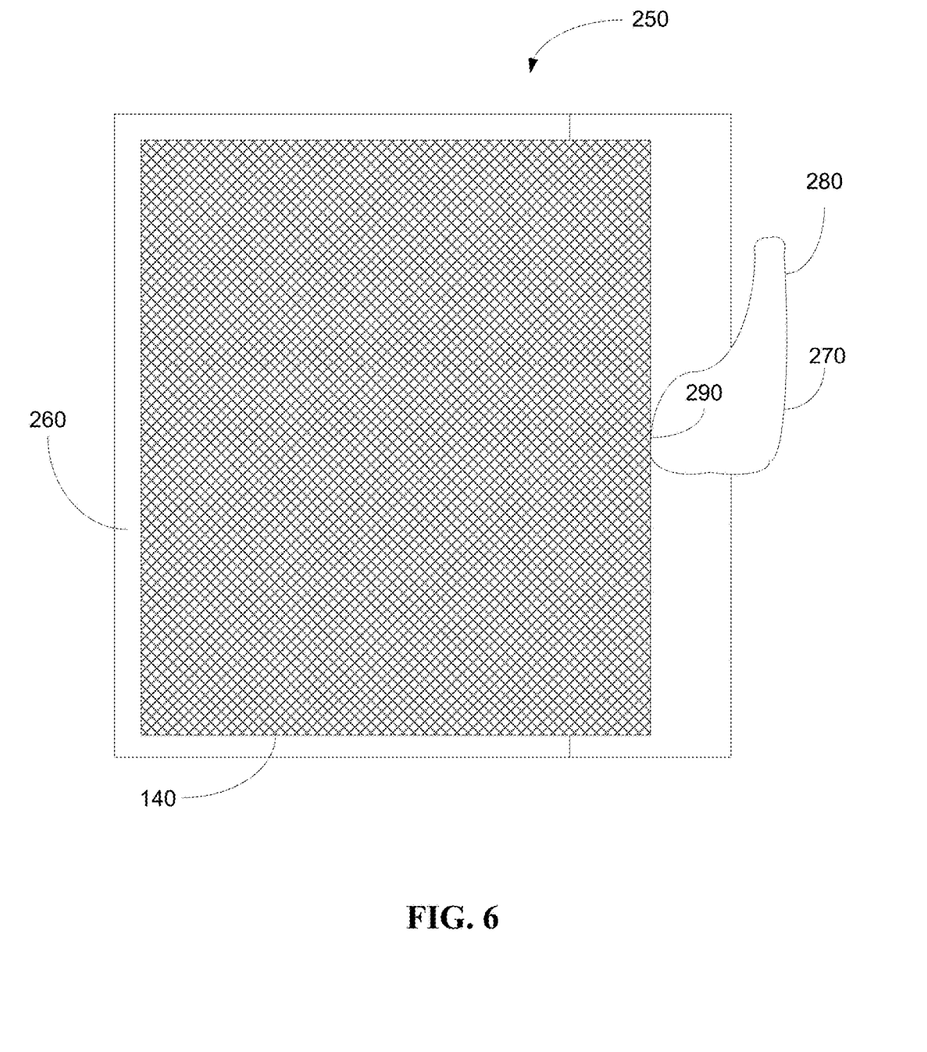
FIG. 6 shows an embodiment of a quick-disconnect member in a first state when the wire feeder is secured according to the present disclosure.
Figure 7:
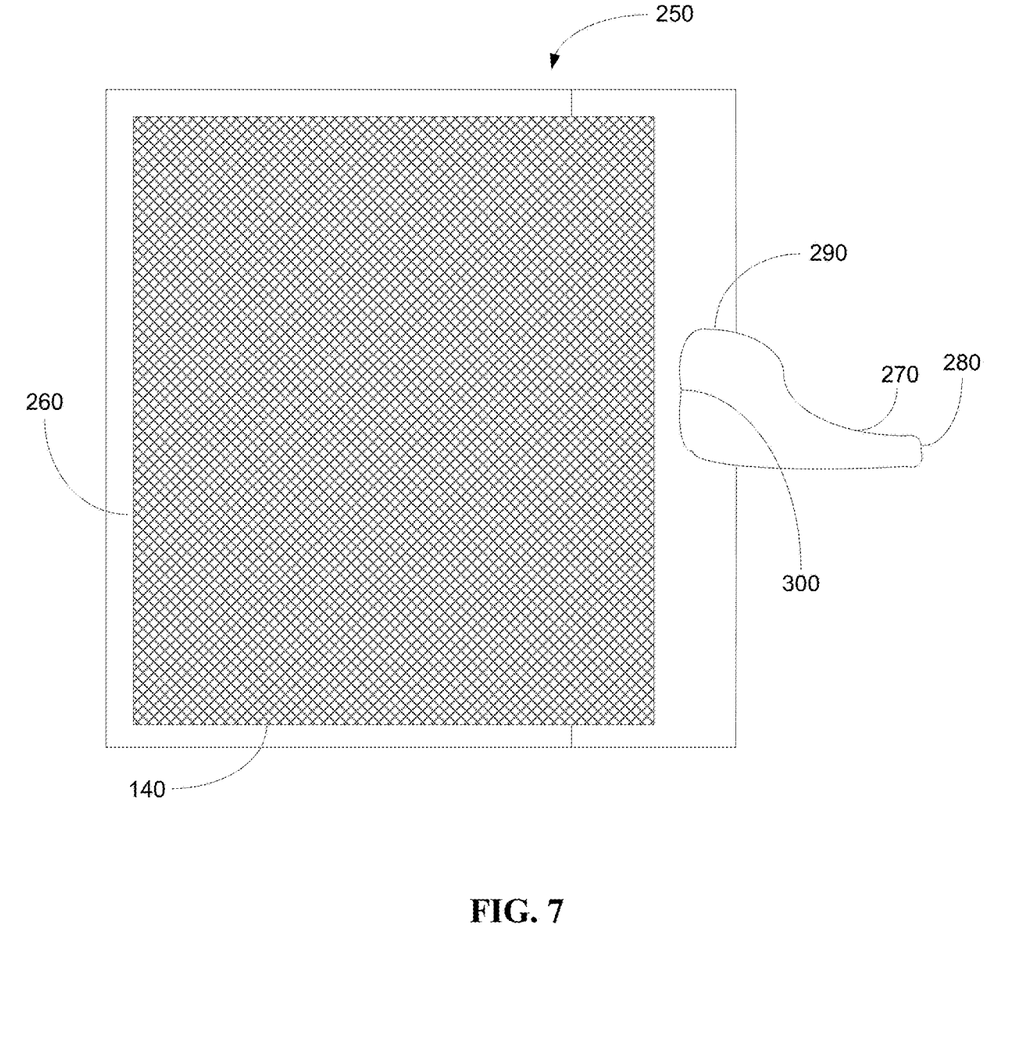
FIG. 7 shows the quick-disconnect member shown in FIG. 6 in a second state when the wire feeder is no longer secured and can be removed according to the present disclosure.

FIGS. 6 and 7 show different states of an embodiment of a quick-disconnect assembly according to the present disclosure.

Referring to FIG. 6, an adapter 250 is shown that includes one or more walls 260 and one or more quick-disconnect members 270. The adapter 250 can rest on the wire feeder support 130 or can be part of the wire feeder support 130. In some embodiments, the adapter 250 can rest on the robotic arm 120 or can be part of the robotic arm 120.

The wire feeder 140 rests on top of the adapter 250 and is physically secured in the adapter 250 by pressure (e.g., force) exerted by the quick-disconnect member 270 (e.g., cam lever). The quick-disconnect member 270 can rotate by manually actuating the handle 280. In the position shown in FIG. 8, a side 290 of the quick-disconnect member 270 applies pressure to the wire feeder 140 and pushes it against the wall 260 of the adaptor 260. The wire feeder 140 is physically secured between the quick-disconnect member 270 and the wall 260. In some embodiments when the wire feeder 140 is secure, the side 290 of the quick-disconnect member 270 and/or the wall 260 of the adaptor 250 is applying pressure to one or more of the following of the wire feeder 140: the plate 200, the isolation housing 240, the front cover 220, and the back cover 225.

By rotating the quick-disconnect member 270, the previous side 290 is rotated away from the wire feeder 140 and the nearest side 300 of the quick-disconnect member 270 is no longer in contact with the wire feeder 140 as shown in FIG. 7. In some embodiments, the nearest side 300 is lightly touching the wire feeder 140. In this state, whether the quick-disconnect member 270 is no longer touching or is only lightly touching the wire feeder 140, the wire feeder 140 can be removed from the adaptor 250, and thus removed from the robotic arm 120 and/or the automatic welding system 100.

After the wire feeder 140 has been fixed or replaced, the wire feeder 140 can be placed in the adaptor 250 and the handle 280 can be used to rotate the quick-disconnect member 270 so that it is in the secure state as shown in FIG. 8.

Although illustrated as a single cam lever, the quick-disconnect member 270 can include more than one cam lever. Further, some embodiments contemplate using thumb screws or trigger locks instead of or in addition to the cam levers.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. A welding system, comprising:
   an adaptor including a quick-disconnect member; and
   a wire feeder that comprises one or more isolation components configured for electrically isolating the wire feeder from the adaptor and the welding system as a whole, the one or more isolation components comprising a plate on which remaining components of the wire feeder rest,
   wherein:
      the adapter is configured to engage and secure the wire feeder when used in the welding system;
      the wire feeder is removable from the adaptor after the quick-disconnect member has been actuated; and
      the quick-disconnect member is configured to facilitate removal of the wire feeder without using a tool, and
   wherein the wire feeder comprises:
      isolation members configured to electrically isolate the wire feeder from the adaptor and the welding system as a whole, and
      an isolation housing that houses the isolation members, and
      wherein the wire feeder is configured to be removed without disassembling the isolation members.

2. The welding system according to claim 1, wherein the adaptor is disposed on a robotic arm that has a welding torch.

3. The welding system according to claim 1, wherein the welding system is an automatic welding system.

4. The welding system according to claim 1, wherein the quick-disconnect member includes a cam lever.

5. The welding system according to claim 1, wherein the quick-disconnect member includes a thumb screw.

6. The welding system according to claim 1, wherein the quick-disconnect member includes a trigger lock.

7. The welding system according to claim 1, wherein the plate is secured by one or more walls of the adaptor and the quick-disconnect member.

8. The welding system according to claim 1, wherein the wire feeder is secured by one or more walls of the adaptor and the quick-disconnect member.

9. The welding system according to claim 1, wherein, when the quick-disconnect member is set into a first state, the quick-disconnect member and one or more walls of the adapter secure the wire feeder in place.

10. The welding system according to claim 9, wherein the quick-disconnect member is rotated to a second state, and wherein the quick-disconnect member is no longer directly touching the wire feeder.

11. The welding system according to claim 10, wherein, in the second state, the wire feeder can be removed without using a tool.

12. The welding system according to claim 1, wherein the wire feeder includes isolation components that electrically isolate the wire feeder, and wherein the wire feeder can be removed from the adaptor without accessing the isolation components.

13. A wire feeder system for use in a welding system, comprising:
   an actuator that includes a quick-disconnect member;
   a wire feeder that includes a motor assembly and a wire drive assembly,
   wherein the wire feeder comprises one or more isolation components configured for electrically isolating the wire feeder from the adaptor and the welding system as a whole, the one or more isolation components comprising a plate on which remaining components of the wire feeder rest,
   wherein the wire feeder comprises:
      isolation members configured to electrically isolate the wire feeder from the adaptor and the welding system as a whole, and
      an isolation housing that houses the isolation members, wherein the wire feeder is configured to be removed without disassembling the isolation members
   wherein the wire feeder is physically secured and physically unsecured by actuating the quick-disconnect member, and
   wherein the quick-disconnect member is configured to be actuated without using a tool.

14. The wire feeder system according to claim 13, wherein the wire feeder is physically secured and physically unsecured by actuating the quick-disconnect member without using a tool.

15. The wire feeder system according to claim 13, wherein the welding system is an automatic welding system that employs a robotic arm with a welding torch.

16. The wire feeder system according to claim 13, wherein the quick-disconnect member includes a cam lever, and wherein the actuating of the quick-disconnect member includes rotating the cam lever.

17. The wire feeder system according to claim 13, wherein the wire feeder can be removed from the adaptor without accessing the isolation components.

18. The welding system according to claim 1, wherein the wire feeder comprises a communications port for providing control communications with the wire feeder.

19. The welding system according to claim 1, wherein the wire feeder comprises a gas port that provides an inlet for shielding gas that is used during welding operations.

20. The welding system according to claim 1, wherein the wire feeder comprises a back cover and a front cover,
   wherein the back cover houses one or both of:
      parts, circuitry, and/or components for controlling the wire feeder, and
      motor assembly, and
   wherein the front cover houses a wire drive assembly configured for feeding wire during welding operations.

* * * * *